UNITED STATES PATENT OFFICE.

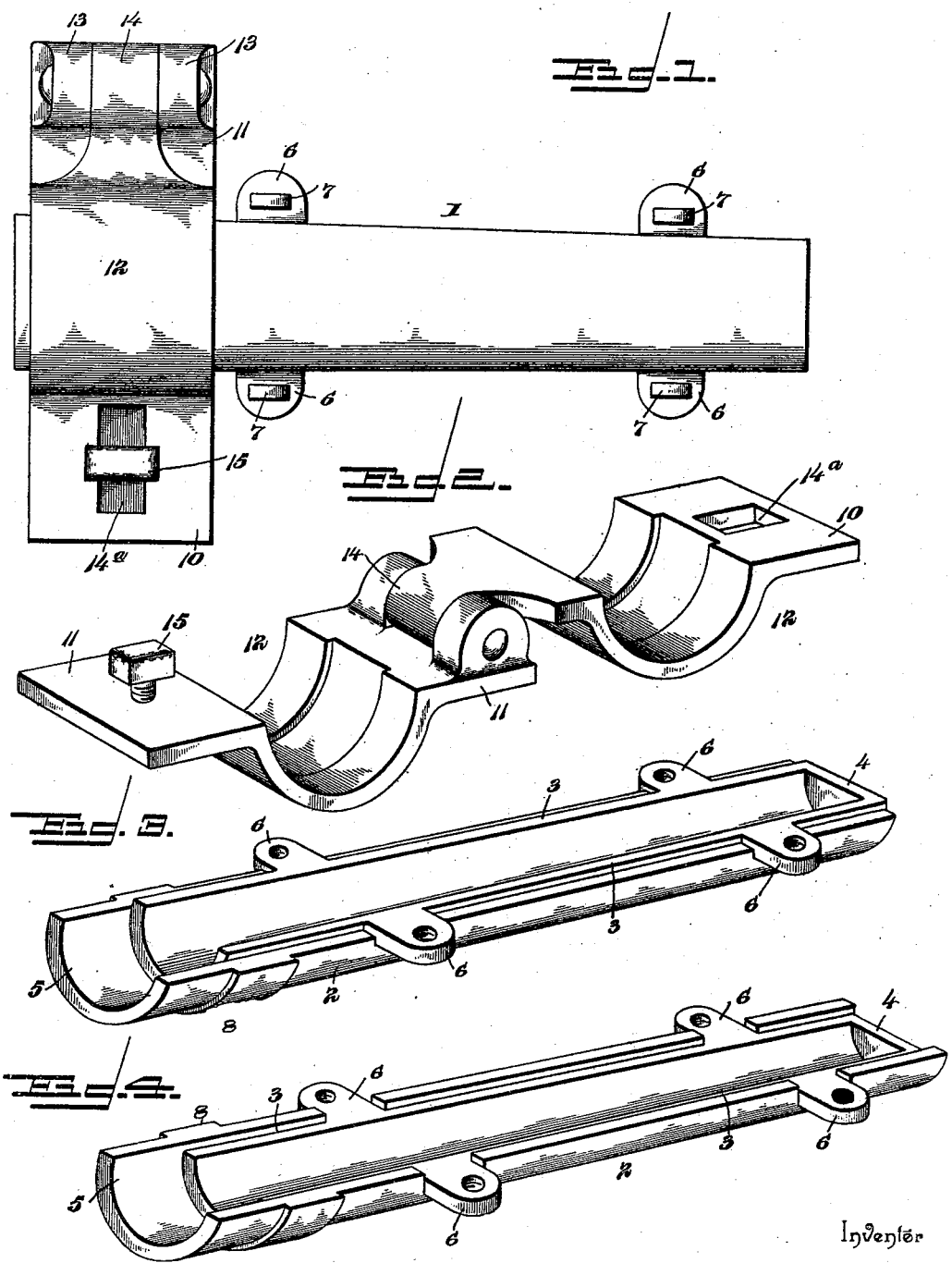

SIDNEY YATES, OF JOHNSTOWN, NEW YORK.

COUPLING FOR SLED-RUNNERS.

SPECIFICATION forming part of Letters Patent No. 553,951, dated February 4, 1896.

Application filed March 11, 1895. Serial No. 541,321. (No model.)

*To all whom it may concern:*

Be it known that I, SIDNEY YATES, a citizen of the United States, residing at Johnstown, in the county of Fulton and State of New York, have invented a new and useful Coupling for Bob-Sleds, of which the following is a specification.

The invention relates to improvements in couplings for bob-sleds.

The object of the present invention is to provide a simple and inexpensive device which will enable bob-sleds to be readily coupled to the spindles of an axle after the wheels have been removed and which will protect the spindles from wear and from the weather.

The invention consists in the construction and novel combination and arrangement of parts hereinafter fully described, illustrated in the accompanying drawings, and pointed out in the claims hereto appended.

In the drawings, Figure 1 is a plan view of a device constructed in accordance with this invention. Fig. 2 is a detail perspective view of the clip. Figs. 3 and 4 are detail perspective views of the sections of the sleeves.

Like numerals of reference indicate corresponding parts in all the figures of the drawings.

1 designates a tapering cylindrical sleeve composed of two longitudinal sections 2, conforming to the configuration of the spindle of an axle and having slightly-tapering inner diameters. The sections are semicylindrical and are provided with interlocking edges 3 and have segmental flanges 4 at their outer ends, whereby when the sections are secured together the outer end of the sleeve will be closed to prevent the access of moisture. The inner ends 5 of the sections have their bores slightly enlarged to fit over the shoulder at the inner end of the spindle, and at diametrically-opposite points adjacent to their inner and outer ends the sections are provided with corresponding ears 6, arranged in pairs when the sections are together and connected by screws 7, whereby the sections are firmly clamped on a spindle, and the sleeve is prevented from turning thereon, thereby obviating all wear on the spindle.

Adjacent to its inner end the sleeve is provided with an annular collar or boss 8, which is received within corresponding grooves 9 of upper and lower sections 10 and 11 of a clip 12, which is provided with a cylindrical portion embracing the sleeve. The lower section, 11, is designed to be bolted or otherwise secured to any suitable construction of bob-sled or sleigh attachment, and it is provided at one end with a pair of ears 13, between which is pivoted an ear 14 of the adjacent end of the other section, 10. The free end of the upper section is provided with a longitudinal slot or opening 14$^a$, in which is received the head of a screw or button 15, which is adapted to be turned transversely of the slot to lock the sections of the clip detachably in engagement with the sleeve. The annular boss or collar of the sleeve and the groove of the cylindrical portion of the clip form a firm connection, which prevents the parts from becoming loose.

It will be seen that the device is exceedingly simple and inexpensive in construction and that it is capable of enabling bob-sleds to be readily attached to the spindles of vehicle-axles. It will also be apparent that the clip connection is adapted to clamp the sleeve firmly and that the annular boss and groove prevent the clip from becoming displaced by any movement longitudinal of the sleeve. The sleeve also forms a cap for protecting the spindle of an axle, and as the sleeve is stationary on the spindle and the clip is adapted to rock on the sleeve to accommodate itself to the movements of a bob-sled the spindle will not receive the wear and the sleeve or the clip will become worn by such movement if there be any wear at all.

Changes in the form, proportion, and the minor details of construction may be resorted to without departing from the principle or sacrificing any of the advantages of this invention.

What I claim is—

1. A device of the class described, comprising a stationary sleeve closed at its outer end, and conforming to the configuration of the spindle of an axle and forming a cap for the same, and a clip designed to be secured to a sled, and composed of two separable sections detachably engaging the sleeve, substantially as described.

2. A device of the class described, comprising a stationary sleeve composed of two semicylindrical sections provided at their outer ends with segmental flanges and having at opposite points perforated ears, screws mounted on the ears and connecting the sections and clamping the sleeve on a spindle, and a clip detachably engaging the sleeve for connecting the same with a sled, substantially as described.

3. A device of the class described, comprising a stationary sleeve having two separable semicylindrical sections and closed at its outer end, means for clamping the sleeve to an axle, an annular boss or collar arranged on the exterior of the sleeve, and a clip detachably engaging the sleeve for connecting the same with a bob-sled or the like, said clip being composed of two sections hinged together at one end and detachably secured at the other, and provided with a cylindrical portion having an annular groove to receive the said boss or collar of the sleeve, substantially as described.

4. A device of the class described, comprising a stationary sleeve composed of two sections and provided with means for clamping it to a spindle, and a clip embracing the sleeve and designed to be secured to a sleigh attachment, or the like, and capable of rocking on the sleeve, substantially as described.

In testimony that I claim the foregoing as my own I have hereto affixed my signature in the presence of two witnesses.

SIDNEY YATES.

Witnesses:
W. H. CARPENTER,
G. H. FOX.